United States Patent Office 3,784,522
Patented Jan. 8, 1974

3,784,522
SELF-BONDING ELASTOMERIC SEALANT
Basil P. Gray, Negley, Ohio, assignor to Commercial Shearing, Inc., Youngstown, Ohio
No Drawing. Filed Oct. 16, 1972, Ser. No. 297,767
Int. Cl. C08g 22/04
U.S. Cl. 260—77.5 CR    10 Claims

ABSTRACT OF THE DISCLOSURE

A sealant material for steel or concrete tunnel segments and the like is the product of a urethane type reaction between a hydroxy terminated polybutadiene liquid resin with a polyfunctional isocyanate incorporating a monomeric halogenated phosphate ester.

---

This invention relates to sealant or gasket material for concrete or steel tunnel or pipe segments and the like. It is more particularly concerned with such a sealant or gasket which bonds to the segment and to a similar gasket on an adjoining pipe segment so as to make a water tight joint between segments.

Tunnels, drains and the like which are required to be water tight are not infrequently made by positioning a series of pre-fabricated cylindrical segments in a bore, and jacking each segment against the preceding one to close the gaps between them. It is, of course, necessary to seal each of these joints if leaks are to be prevented. Conventionally these are caulked in the field, and the tunnel made water tight by lining it with concrete. The caulking of joints in the field is laborious and time consuming, and it is much more expeditious to apply gasket or sealant material to the ends of the segments in the shop. A desirable material for this purpose should be inert to ground waters and to whatever fluids are carried by the tunnel or pipe, if any, and not extrude from the joint at the high jacking pressure. It should be elastic in compression, should readily adhere to the gasket of an adjoining segment at gasket or sealant interface, and should be repairable if damaged.

Urethane elastomeric polymers are in many respects well suited for sealants for concrete pipe and tunnel segments. They are applied to the mating surfaces of the segments as a machine-mixed two-component blend, and cure rapidly to a strong resilient elastomer which is inert to most chemicals. Unfortunately, urethanes hydrolyze in the presence of water or steam. Moreover, fully cured urethane elastomers are so inert that gaskets made of them will not bond or weld to each other, even under pressure, and fresh, uncured urethane will not adhere to cured material. Thus, high pressure water-tight joints between tunnel segments cannot readily be made using conventional urethanes, and damaged or leaking gaskets of those materials cannot easily be repaired.

It would seem that adhesion between fresh, or uncured, and cured urethane material could be promoted by using an excess amount of polyol in the cured material, which would remain unreacted until it was contacted by the isocyanate of the uncured material. I have found that a certain degree of adhesion between fresh and cured material can be achieved by incorporating in the urethane a crude phenolic by-product of the naval stores industry sold under the trade name "Vinsol." However, the physical properties of gasket material so modified were degraded.

It is the object of my invention, therefore, to provide a sealant or gasket material for concrete or steel pipe and tunnel segments which is applied to the mating ends of the segments and which in its fully cured condition bonds to itself when the segments are laid in place in the trench or bore and are jacked together. It is another object of my invention to provide such a sealant or gasket material which in its fully cured condition cold bonds to itself under pressure without the use of a solvent. It is still another object of my invention to provide such a sealant or gasket material to which in its fully cured condition fresh gasket material will adhere. Other objects of my invention will appear in the description thereof which follows.

I have found that the objects above mentioned are realized in a novel sealant or gasket material which is the fully cured product of a urethane type reaction incorporating as an additive a halogenated phosphate ester. My preferred material is made by mixing a hydroxy terminated polybutadiene liquid resin polymer or copolymer with a polyfunctional isocyanate, a reinforcing polyol and a catalyst. With this is incorporated the additive above mentioned, to be described more fully hereinafter. The mixture is conveniently applied by spraying to each mating surface of the tunnel or pipe segments and cured, preferably at ambient temperature. When the segments are laid in place and their mating surfaces brought together under pressure, without the application of heat or any solvent, the abutting gaskets weld or bond together forming a bond that withstands a water pressure of 60 lbs. per sq. inch. Jacking forces as high as 2,000 lbs. per sq. inch, however, do not cause the gasket material to cold flow out of the joint.

My preferred additives are chlorinated or brominated ethyl or propyl phosphates, and I prefer to incorporate my additive in amounts between 7% and about 10% by weight of the aggregate elastomer composition. However, self-bonding of the material is improved by introduction of as little as 1% of the additive. Amounts larger than about 10% have a plasticizing effect and do not improve bond strength.

To determine the effectiveness of various additives, I have utilized a polymer having the following composition, in parts by weight:

Hydroxy terminated liquid polybutadiene resin __ 100.0
N-N bis (2 hydroxy propyl) aniline _____ 16.8
Dibutyl tin dilaurate _____ 0.02
Diphenyl methane di-isocyanate _____ 34.5

The aniline derivative is a known cross-linking agent which controls deformation and cold flow of the elastomer under pressure. The dilaurate is a known catalyst. To this composition was added ten parts by weight of an additive selected from those mentioned hereinafter. A slab of elastomer was then cast and oven cured for twenty hours at 80° C. To determine adhesion between cured and uncured material a one-inch strip of fresh elastomeric composition was cast on the surface of the slab, cured and peeled off.

The peel strength of the control, both slab and strip of the elastomer without additive, was 3 lbs. per inch, and was the same for fresh elastomer containing the additive cast on a slab of elastomer without additive. In contrast, the adhesion between slab and strip each containing the same additive from the following three compounds was so great that one or the other was torn in the peel test:

tris (dichloropropyl) phosphate
tris (beta chloroethyl) phosphate
tris (2,3 dibromopropyl) phosphate.

Triphenyl phosphate, tricresyl phosphate, triphenyl phosphite, O,O-diethyl-N,N-bis (2-hydroxyethyl) aminomethylphosphonate, Monsanto's proprietary plasticizer "Santicizer" which is said to have the formula:

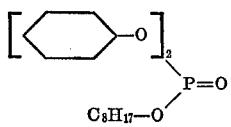

and Monsanto's proprietary polymeric phosphate "Phosgard C-22R" which is said to have the structural formula:

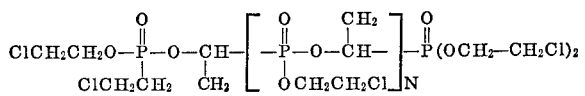

were tried, but did not significantly improve peel strength. No additives other than those mentioned herein were tried.

My elastomeric sealants above described do not hydrolyze, or extrude when the segments to which they are applied are jacked together. Under jacking pressure my sealants or gaskets on adjoining segment flanges bond together so firmly that they cannot be separated without tearing. If the gasket is damaged it is repaired by the application thereto of fresh or uncured sealant material, which cures at atmoshperic temperature and bonds to the previously cured sealant so firmly that it cannot be separated therefrom without tearing.

In the foregoing specification I have described a presently preferred embodiment of this invention, however, it will be understood that this invention can be otherwise embodied within the scope of the following claims.

I claim:

1. An elastomeric sealant which bonds to concrete or steel tunnel segments and the like and to itself in its cured state comprising the product of the reaction between a hydroxy terminated polybutadiene liquid resin polymer or copolymer with a polyfunctional isocyanate and, as an additive, a monomeric halogenated phosphate ester.

2. The elastomeric sealant of claim 1 in which the additive is present in amounts between about 1% and about 10%.

3. The elastomeric sealant of claim 2 in which the additive is present in amounts between about 7% and about 10%.

4. The elastomeric sealant of claim 1 in which the additive is a monomeric chlorinated phosphate ester.

5. The elastomeric sealant of claim 4 in which the additive is tris (dichlorophenyl) phosphate.

6. The elastomeric sealant of claim 4 in which the additive is tris (beta chloroethyl) phosphate.

7. The elastomeric sealant of claim 1 in which the additive is a monomeric brominated phosphate ester.

8. The elastomeric sealant of claim 1 containing a reinforcing polyol.

9. The elastomeric sealant of claim 8 in which the reinforcing polyol is N-N bis (2 hydroxy propyl) aniline.

10. The elastomeric sealant of claim 7 in which the additive is tris (2,3-dibromopropyl) phosphate.

References Cited
UNITED STATES PATENTS 3,034,996   5/1962   Kaplan _____ 260—30.6 R
3,714,110   1/1973   Verdol et al. ____ 260—77.5 CR MAURICE J. WELSH, Jr., Primary Examiner U.S. Cl. X.R.
260—30.6 R, 2.5 AJ, 77.5 AQ